UNITED STATES PATENT OFFICE.

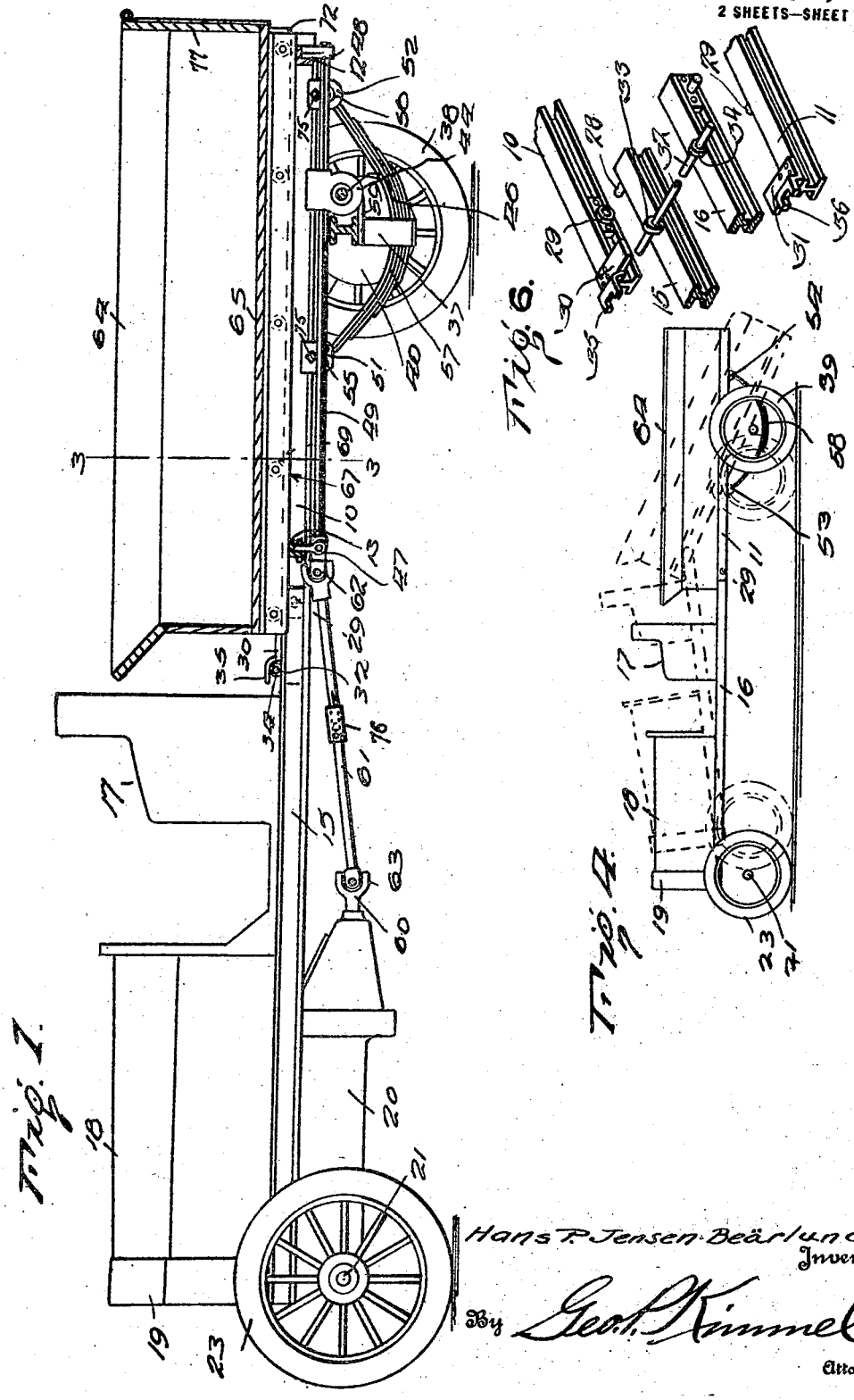

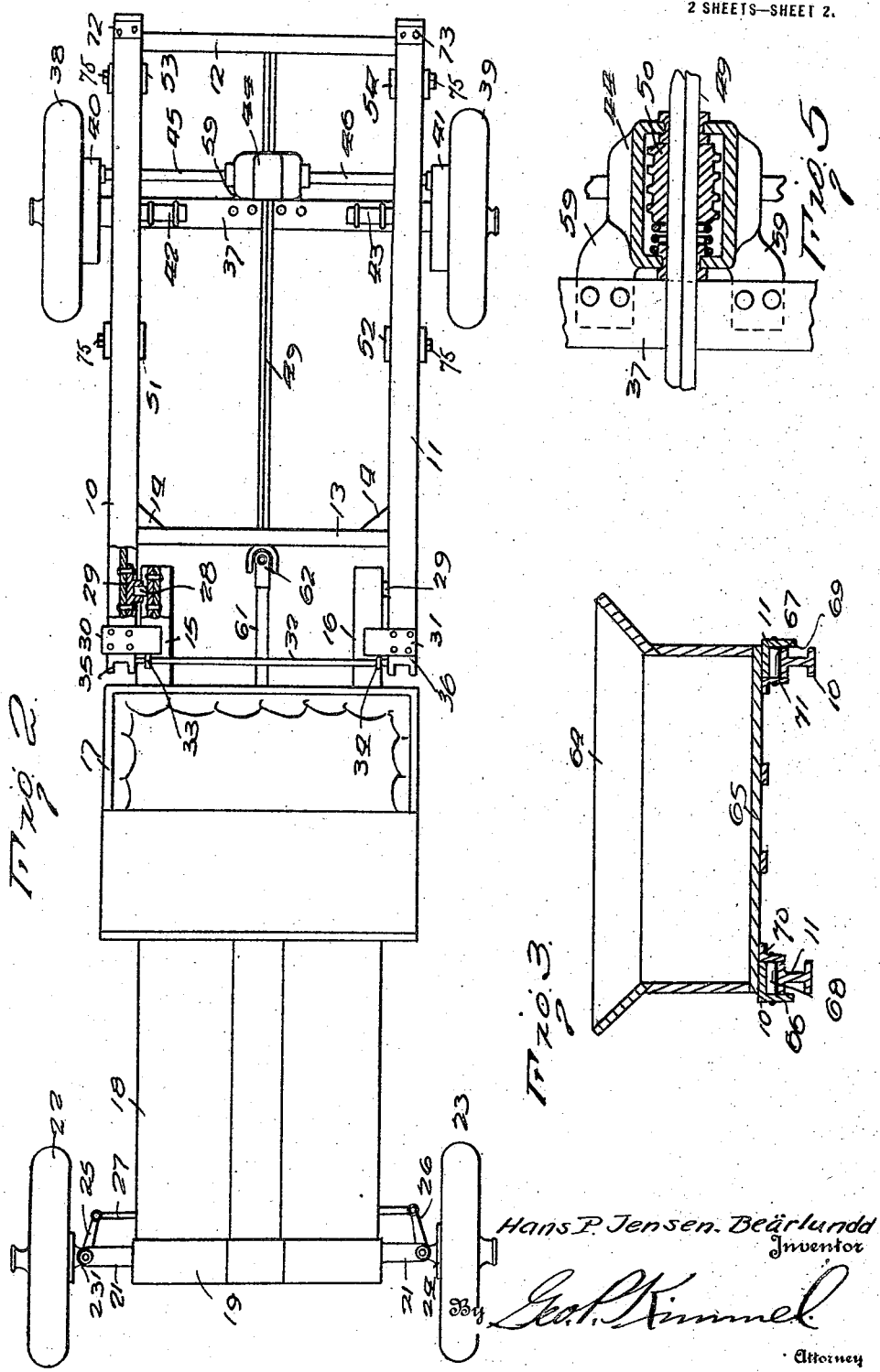

HANS P. JENSEN-BEÄRLUNDD, OF LISBON, PORTUGAL.

DUMP WAGON.

1,414,954.   Specification of Letters Patent.   Patented May 2, 1922.

Application filed July 2, 1919. Serial No. 308,255.

*To all whom it may concern:*

Be it known that I, HANS P. JENSEN-BEÄRLUNDD, a citizen of Denmark, residing at Lisbon, Portugal, have invented certain new and useful Improvements in a Dump Wagon, of which the following is a specification.

This invention relates to motor vehicles of the truck pattern for hauling heavy loads, and has for one of its objects to provide a device of this character having simple means for dumping the load by gravity only by changing the center of gravity of the load to cause the body portion to automatically tilt to discharge the load.

Another object of the invention is to provide a device of this character having means for shifting the rear axles and carrying wheels forwardly of the body to bring the greater quantity of the load rearwardly of the axle and thus causing the body to automatically tilt and dump the load.

With these and other objects in view the invention consists in certain novel features of construction as hereafter shown and described and then specifically pointed out in the claims, and in the drawings illustrative of the preferred embodiment of the invention.

Figure 1 is a longitudinal sectional elevation of the improved apparatus.

Figure 2 is a plan view partly in section with the load carrying body or box removed, Figure 3 is a transverse section on the line 3—3 of Figure 1, Figure 4 is a diagrammatic view on a smaller scale illustrating the arrangement of the parts after the vehicle is disposed in dumping position, Figure 5 is an enlarged sectional detail of a part of the differential gearing.

Fig. 6 represents contiguous portions of the forward and rear frames and their attachments, illustrating the construction more fully.

The improved vehicle includes a supporting frame formed in two portions, a rearward portion carrying the rear carrier wheels, the box or load supporting portion of the device, and the motion transmitting mechanism whereby the rear axle is operated; the forward frame portion carrying a driver's seat and the engine and the covering hood together with the forward axle and the steering apparatus. The rear supporting portion comprises side members 10—11 connected at the rear ends by a transverse stay 12 and near their forward ends by a transverse stay 13. Corner brace members 14 are likewise employed to connect the members 13, 10 and 11 so that the rear portion comprises a very strong frame. The side members are preferably formed of I-beams and the members 12—13 are L-beams of suitable strength to withstand the strains to which they will be subjected.

The forward supporting portion comprises side members 15—16 suitably connected and supported in the usual manner and carrying the driver's seat 17 and the hood portion of the engine indicated at 18 and the radiator cover 19. The engine casing is indicated at 20 and supported in the usual manner from the frame members 15—16. The forward axle is indicated at 21 with the forward carrying wheels 22—23 connected thereto in the usual manner by the stub-axles indicated 23'—24 the steering arms 25—26 and the connecting rod at 27. The side members 10—11 extend forwardly of the rear portions of the side members 15—16 and are swingingly coupled to the side members 15 and 16 of the forward frame members as shown more clearly in Figure 2. The coupling devices between the forward and rearward side members of the frame are substantially alike and the description of one will suffice for both. The members 15—16 are each provided with a stud 28 and the adjacent portions of the members 10—11 are each provided with a socket member 29 in which the studs bear as illustrated in Figure 2. By this means the frame members are capable of being buckled upwardly when the dumping action occurs as hereafter described.

Bearing upon the forward portion of member 10 is a plate 30 which extends over the adjacent portion of the members 15, while a similar plate 31 is connected to the forward portion of the member 11 and extends over the adjacent portion of the member 16. The plates 30—31 are disposed forwardly of the socket devices 28 and 29, so that they operate as stops to limit the downward movement of the members 10—15 and 11—16, while at the same time they do not interfere with the upward movement or buckling action of the members during the dumping operation. Bearing over the members 15—16 is a stay rod 32 connected to the members 15—16 by U-bolts 33—34. The member 30 is provided with a forwardly directed overhanging shield portion 35, while the member 31 is provided with a similar overhanging shield portion 36. The outer ends of the member 32 extend beneath the portions 35—36. The structure defined by the members 32—33—34—35 and 36 is to be included in another application, and further description is not deemed necessary in the present case. The rear axle 37 is of arcuate form and is provided with stub-axles carrying the rear supporting wheels 38—39. Suitable means, not shown, will be provided for transmitting the motion of the axle 45—46 to the rear wheels 38 and 39. Connected to the rear axle at one side is a leaf spring device 42 which extends beneath the lower web of the member 10, and a similar leaf spring 43 is attached to the axle at the opposite side and extends beneath the lower web of the member 11. The springs serve to relieve the downward pressure and prevent jars and concussions being communicated to the upper portion of the device, and reinforce the main springs of the vehicle. Attached to the rear axle is a housing device 44 carrying a differential mechanism and from which shafts 45—46 extend. The shaft 45 extends into the casing 40 and is provided with a gear pinion, not shown, which engages the internal gear of the casing 40, while the shaft 46 extends into the casing 41 and is provided with a gear pinion, not shown, engaging the internal gear of the casing 41. Supported in suitable bearings 47—48 upon the members 12—13 is a shaft 49, preferably square or other form than round and which is journalled in bearings 47—48 at the ends to enable the shaft to be rotated. The shaft 49 extends through the casing 44 and is provided within the casing with a worm pinion indicated at 50 to engage a worm gear within the casing which operates the usual bevel gears forming the differential gears connected to the shafts 45—46. By this arrangement the rotation of the shafts 49 is communicated to the worm gear and thence to the shafts 45—46 and the rear wheels 38—39 by the action of the gear pinions and the internal gears as indicated. The axle 37 is coupled to the frame members 10 and 11 by springs 57, as shown in Figure 1, to provide sufficient flexibility and prevent cramping. Slidably disposed upon the lower web of the member 10 is a supporting device 51, while a similar supporting device 52 is mounted for slidable movement upon the lower web of the member 11. A suitable supporting device indicated at 53 is mounted for slidable movement upon the lower web of the member 10 while a similar slidable member 54 is mounted upon the lower web of the member 11. The members 51—53 are disposed at equal distances from the axle 37, while the members 52—54 are likewise at uniform distances from the same member 37.

The member 51 is provided with a pin indicated at 55, while the member 53 is provided with a similar pin 56. The pins 55—56 are connected to a relatively heavy leaf spring 57 which is rigidly coupled to the axle 37, while a similar spring 58 is connected to the similar pins of the members 52—54. By this means the frame is supported yieldably upon the rear axle, while at the same time the rear axle together with the springs and the holding devices are movable longitudinally of the members 10—11 to move the rear axle forwardly when required, as hereafter explained. The housing 44 is rigidly coupled to the axle by a bracket device 59, so that it moves with the axle and slides over the shaft 48 when the rear axle is moved as will be obvious. By this means the motion imparted by the shaft 49 is not interfered with by the forward and rearward movement of the rear axle.

A suitable slip sleeve, indicated conventionally at 76, is coupled into the shaft 61, to prevent the cramping of the parts when adjusted.

The shaft 49 is connected at its forward end to the drive shaft 60 of the engine by an intermediate coupling shaft 61 united to the shaft 49 by a universal coupling 62 and to the shaft 60 by a universal coupling 63. The load bearing body of the vehicle is indicated as a whole at 64, of any suitable size and of any suitable construction. The member 64 includes a bottom 65 having L-bars 66—67 on its lower side to bear over the outer faces of the side members 10—11 and with antifriction rollers 68—69 to bear upon the members 10—11 and thus reduce the friction between the frame members 10 and 11 and the supports 66 and 67. At their inner ends the rollers 68—69 are supported by small L-bars 70—71 as shown in Figure 3. At their rear ends the members 10—11 are provided with suitable stops indicated at 72—73 to limit the rearward movement of the body 64, while at the same time permitting the body to be lifted from the members 10—11 when required.

By this means portions 64 of different sizes and forms may be employed in connection with the same supporting members 10 and 11. When in its rear position the rear axle 37 will be located at a sufficient point rearwardly of the body 64 so that the major portion of the load will be in advance of the rear axle, and thus be held in position for transportation. When it is required to dump the load it is only necessary to move the rear axle forwardly a sufficient distance to cause the major portion of the load to be located rearwardly of the axle; the body will thus be dumped, as will be obvious. The improved apparatus thus requires no force to lift the load to produce the dumping action, but it is only necessary to transfer the rear axle to a forward position to bring the major portion of the load rearwardly of the rear axle.

Any suitable means may be employed for moving the rear axle 37 and its attachments forwardly or toward the forward axle or moving the forward axle and the loaded body toward the rear axle, to cause the dumping of the load.

The rear wheels may be manually rotated toward the forward axle, or the rear wheels may be blocked and the loaded forward part of the vehicle moved rearwardly until the load overbalances, but as the manner of changing the center of gravity of the load forms no part of the present invention, it is not thought necessary to further describe the same.

When the load is dumped the forward portion of the members 10—11 are elevated upon the joints 28 and 29 and likewise throw the rear portion of the forward part of the device upwardly as indicated in Figure 4, but this will not interfere with the operation of the device. Suitable means should be provided for temporarily coupling members 51—52—53 and 54 to the members 10 and 11, and an improved means consists of set screws as indicated at 75.

The improved device is simple in construction, can be applied without material structural change or modification to trucks and automobile operating devices of various forms and sizes and to adapt the device to carry any size of load.

For the purpose of illustration the improved device is shown applied to a conventional form of automobile structure, but it is to be understood that it is not desired to limit the invention to any specific form of motor truck or vehicle.

Having thus described the invention what is claimed as new is:

1. A vehicle of the class described comprising a forward frame carrying forward bearing wheels, a motor mounted on said forward frame, a rear frame swingingly coupled to the forward frame and including side members in parallel relation, supporting devices slidably bearing on the side members of said rear frame, a rear axle carrying rear bearing wheels, springs connected to said axle and respectively to said supporting devices, a transmission device carried by the rear axle, a drive shaft extending from said motor, and slidably engaging said transmission device, whereby when the hingedly united frames are broken upwardly the rear axle and its bearing wheels will be moved forwardly without cramping the parts.

2. A vehicle of the class described comprising a forward frame carrying forward bearing wheels and a motor, a rear frame pivotally united to said forward frame, a rear axle supporting rear carrier wheels, means for coupling said axle for movement longitudinally of the rear frame, a drive shaft mounted for rotation upon the rear frame and extending longitudinally thereof, a transmission gear device carried by the rear frame and through which the drive shaft is slidably disposed, and means for operatively coupling the motor to the shaft.

In testimony whereof, I affix my signature hereto.

HANS P. JENSEN-BEÄRLUNDD.